(12) United States Patent
Takahashi

(10) Patent No.: US 9,669,335 B2
(45) Date of Patent: Jun. 6, 2017

(54) FILTER APPARATUS

(71) Applicant: FUJI FILTER MANUFACTURING CO., LTD., Tokyo (JP)

(72) Inventor: Yuichi Takahashi, Utsunomiya (JP)

(73) Assignee: Fuji Filter Manufacturing Co., Ltd., Tokyo (JP)

( * ) Notice: Subject to any disclaimer, the term of this patent is extended or adjusted under 35 U.S.C. 154(b) by 358 days.

(21) Appl. No.: 14/374,219

(22) PCT Filed: Jan. 18, 2013

(86) PCT No.: PCT/JP2013/050933
§ 371 (c)(1),
(2) Date: Jul. 23, 2014

(87) PCT Pub. No.: WO2013/111682
PCT Pub. Date: Aug. 1, 2013

(65) Prior Publication Data
US 2014/0366493 A1 Dec. 18, 2014

(30) Foreign Application Priority Data

Jan. 24, 2012 (JP) ................................ 2012-011696
Nov. 9, 2012 (JP) ................................ 2012-247376

(51) Int. Cl.
*B01D 46/00* (2006.01)
*B01D 29/68* (2006.01)
(Continued)

(52) U.S. Cl.
CPC .......... *B01D 29/684* (2013.01); *B01D 29/117* (2013.01); *B01D 29/23* (2013.01);
(Continued)

(58) Field of Classification Search
CPC . B01D 46/0065–46/0071; B01D 46/00; B01D 46/002; B01D 29/23; B01D 29/52;
(Continued)

(56) References Cited

U.S. PATENT DOCUMENTS 4,454,033 A 6/1984 Verduyn
5,106,500 A 4/1992 Hembree et al.
(Continued)

FOREIGN PATENT DOCUMENTS

JP S59-27807 U 2/1984
JP S 62-174609 U 11/1987
(Continued)

OTHER PUBLICATIONS

Japanese Office Action dated Sep. 1, 2015, which issued in Japanese Application No. 2012-011696, and its partial English language translation.
(Continued)

*Primary Examiner* — T. Bennett McKenzie
(74) *Attorney, Agent, or Firm* — McDermott Will & Emery LLP

(57) ABSTRACT

A filter apparatus including: a casing including, in a sealed space provided therein, a fluid inflow chamber, a filtration chamber and a drain chamber; a filter element provided inside the filtration chamber to let a fluid pass therethrough from inside to outside to perform filtration; a backwash slide member movably provided inside the filter element and removing trapped matter adhering to an inner circumferential surface of the filter element by an inward flow generated by a difference in pressure inside and outside the filter element at the time of backwashing; a backwash pipe that lets the inward flow flow toward the drain chamber; an actuation cylinder that lets the fluid from the backwash pipe flow toward the drain chamber; and a fluid flowing unit
(Continued)

allowing a fluid to flow, enabling a piston member to move inside the actuation cylinder.

7 Claims, 12 Drawing Sheets

(51) Int. Cl.
  *B01D 29/11* (2006.01)
  *B01D 29/52* (2006.01)
  *B01D 29/23* (2006.01)
  *B01D 29/64* (2006.01)
(52) U.S. Cl.
  CPC ......... *B01D 29/52* (2013.01); *B01D 29/6423* (2013.01); *B01D 29/688* (2013.01); *B01D 46/002* (2013.01); *B01D 46/0065* (2013.01); *B01D 46/0071* (2013.01)
(58) Field of Classification Search
  CPC ...... B01D 29/64; B01D 29/68; B01D 29/684; B01D 29/6423; B01D 29/117; B01D 29/688
  USPC ................. 55/282–305; 210/323.2, 408, 411
  See application file for complete search history.

(56) References Cited

U.S. PATENT DOCUMENTS 5,228,993 A * 7/1993 Drori .................. B01D 29/114
                                                       210/107
7,981,290 B2   7/2011 Baumann et al.

FOREIGN PATENT DOCUMENTS

| JP | S63-185411 U | 11/1988 |
| JP | H01-65610 U | 4/1989 |
| JP | 2004-141785 A | 5/2004 |

OTHER PUBLICATIONS

Japanese Office Action dated Jun. 7, 2016, which issued in Japanese Application No. 2012-247376, and partial English language translation thereof.

International Preliminary Report on Patentability (IPRP) dated Aug. 7, 2014, which issued in International Application No. PCT/JP2013/050933, and English language translation.

* cited by examiner

FILTER APPARATUS

TECHNICAL FIELD

The present invention relates to a filter apparatus enabling backwashing, which removes trapped matter adhering to an inner circumferential surface of a cylindrical filter element provided inside a filtration chamber, and more specifically relates to a filter apparatus with a simplified structure for the backwashing, which removes the trapped matter adhering to the inner circumferential surface of the filter element due to filtration, and the filter apparatus capable of improving backwash efficiencies of the filter element.

BACKGROUND ART

Conventionally, in a filtration process of liquid for general industrial use such as cooling water for various apparatuses or process liquid, a filtration process of oil such as lubricating oil and diesel fuel oil, and a filtration process of gas and the like of various raw materials for use in a chemical plant and the like, various filter apparatuses are used for the purpose of trapping and removing fine particles, dust, and the like contained therein.

When filtration is performed by the filter apparatus for a long time, solid matter, accreted dust, and the like trapped on a filter element accumulate on the filter element, so that resistance of a fluid flowing from an inside to an outside of the filter element increases, and this ultimately makes the fluid to be filtered (target fluid) difficult to filter. In order to cope with this problem, for example, a process called "backwashing," in which a fluid is made to pass through the filter element in a reverse direction of a filtering direction to remove trapped matter adhering to the filter element, is carried out periodically to restore filtering performance of the filter element.

The abovementioned backwashing process is effective. However, there may be a case in which the trapped matter adhering to the filter element is not removed completely and remains. In this case, even with repeated backwashing, the resistance of the fluid flowing from the inside to the outside of the filter element increases, and the target fluid becomes difficult to be filtered. In particular, as in a case of filtration of liquid, when accreted dust, dust covered with highly adhesive materials, and the like firmly adhere to a surface of the filter element, it is difficult to restore filtering performance of the filter element only by the backwashing making the fluid pass through the filter element in the reverse direction of the filtering direction. Among other things, a filter apparatus which uses a filter element having a pore size of less than 100 μm has such a tendency.

In order to cope with this problem, there was proposed a filter apparatus for restoring filtering performance of a filter element. As such a filter apparatus, there is proposed a filter apparatus including a housing which surrounds and seals a cylindrical filter, a raw-water pressure and supply unit which pressurizes and supplies raw water to a raw water chamber located inside the filter, a discharge unit which discharges filtrate from a filtrate chamber located outside the filter, an intake nozzle which is disposed in the raw water chamber and has an opening facing an inner surface of the filter, a wash water discharge unit which is connected to the intake nozzle and discharges drawn used wash water to the outside of the raw water chamber, a suction control unit which controls the wash water discharge unit to thereby control suction of the used wash water drawn through the intake nozzle, a nozzle moving unit which moves the intake nozzle along the inner surface of the filter, a backwash nozzle which is disposed in the filtrate chamber in a position opposed to the intake nozzle and through which backwash water is supplied, a backwash water supply unit which pressurizes and supplies the backwash water to the backwash nozzle, and a backwash nozzle moving unit which moves the backwash nozzle in synchronization with the intake nozzle (for example, refer to Patent Document 1).

REFERENCE DOCUMENT LIST

Patent Document

Patent Document 1: Japanese Patent Application Laid-open Publication No. 2004-141785

SUMMARY OF THE INVENTION

Problems to be Solved by the Invention

However, to carry out the backwashing for removing trapped matter adhering to an inner surface of a filter, the conventional filter apparatus requires the suction control unit which controls suction of the used wash water drawn through the intake nozzle and the backwash water supply unit which pressurizes and supplies the backwash water to the backwash nozzle, to supply the backwash water through the backwash nozzle opposed to the intake nozzle at the same time as sucking the used wash water through the intake nozzle facing the inner surface of the filter. The conventional filter apparatus also requires a mechanical structure, in which the intake nozzle moving unit and the backwash nozzle moving unit, and an electric gear motor, a ball screw, and the like are combined, to move the intake nozzle and the backwash nozzle backward and forward in synchronization with each other. This complicates a structure for the backwashing of the filter and increases the size of the overall apparatus. For these reasons, such a filter apparatus is not positively used in practice.

In view of the abovementioned problems, an object of the present invention is to provide a filter apparatus with a simplified structure for backwashing, which removes trapped matter adhering to an inner circumferential surface of a filter element due to filtration, and the filter apparatus capable of improving backwash efficiencies of the filter element.

Means for Solving the Problems

In order to solve the abovementioned problems, a filter apparatus according to a first aspect of the present invention includes: a casing that includes, in a sealed space provided therein, a fluid inflow chamber into which a target fluid flows from the outside, a filtration chamber in which the target fluid flowing in from the fluid inflow chamber is filtered and flows outside, and a drain chamber through which trapped matter separated by filtration in the filtration chamber is discharged outside; a cylindrical filter element that is provided inside the filtration chamber, and that is closed at one end thereof and is open at the other end thereof located closer to the fluid inflow chamber, and lets the fluid pass therethrough from an inside to an outside to perform filtration; a backwash slide member that is provided inside the filter element in a manner such that an outer circumferential portion of the backwash slide member slides in contact with an inner circumferential surface of the filter element and in a manner capable of moving backward and forward in an axial direction of the filter element, and that removes the trapped matter adhering to the inner circumferential surface of the filter element by means of an inward flow generated by a difference in pressure inside and outside the filter element at the time of backwashing; a backwash pipe, a base end of which is connected with one side surface of the backwash slide member, and that is provided with a piston member at the other end of the backwash pipe, and provided with at least one aperture portion at a location in contact with a fluid flowing passage formed in the backwash pipe in an axial direction thereof, the aperture portion having an opening smaller than a cross-sectional area of the fluid flowing passage, wherein the backwash pipe lets the inward flow generated in the backwash slide member flow toward the drain chamber; an actuation cylinder, in which the piston member provided on the backwash pipe is fitted from one end of the actuation cylinder in a manner such that the piston member is capable of moving backward and forward, to move the backwash slide member backward and forward inside the filter element, wherein the other end of the actuation cylinder extends into the drain chamber, to let the fluid from the backwash pipe flow toward the drain chamber; and a fluid flowing unit that allows the fluid to flow into and out of the actuation cylinder to enable the piston member of the backwash pipe fitted in the actuation cylinder to move backward and forward inside the actuation cylinder. Pressure at a fluid outlet from the filtration chamber is set to be higher than normal pressure, pressure at a fluid inlet to the fluid inflow chamber is set to be higher than the pressure at the fluid outlet, and a drain outlet of the drain chamber is opened and closed to a lower pressure side than the pressure at the fluid outlet, to carry out the backwashing.

The backwash slide member may be formed to be a disk-shaped member and may have within a thickness thereof a gap in which the fluid flows inward from the outer circumferential portion to a center portion thereof due to the difference in pressure inside and outside the filter element, and the gap may communicate with the fluid flowing passage of the backwash pipe.

Along an outer circumferential portion of one side surface or each of side surfaces of the disk-shaped member, the backwash slide member may be provided with a brush, or a scraper formed in a blade shape or a paddle shape, which slides in contact with the inner circumferential surface of the filter element over the entire circumference thereof.

The backwash slide member may be provided with at least one fluid passing opening arranged on disk surfaces of the disk-shaped member and on a portion except for a connecting portion with the fluid flowing passage, the at least one fluid passing opening penetrating from one side surface to the other side surface.

The fluid flowing unit may allow the fluid to freely flow into and out of a space between a closing member provided at the one end of the actuation cylinder and the piston member of the backwash pipe fitted in the actuation cylinder.

The fluid flowing unit may supply and discharge a control fluid into and from a space between a closing member provided at the one end of the actuation cylinder and the piston member of the backwash pipe fitted in the actuation cylinder.

The backwash slide member may be provided at one end of the backwash pipe, and at least one additional backwash slide member, configured to enable the inward flow generated by the difference in pressure inside and outside the filter element to enter the fluid flowing passage, may be provided in a middle portion in the axial direction of the backwash pipe.

A filter apparatus according to a second aspect of the present invention includes at least two filter units arranged in parallel in a casing including, in a sealed space provided therein, a fluid inflow chamber into which a target fluid flows from outside, a filtration chamber in which the target fluid flowing from the fluid inflow chamber is filtered and flows outside, and a drain chamber through which trapped matter separated by filtration in the filtration chamber is discharged outside. Each of the filter units is formed by integrally combining the filter element, the backwash slide member, the backwash pipe, the actuation cylinder, and the fluid flowing unit, according to the first aspect of the present invention.

The filter units may be divided into at least two groups each having at least one filter unit, and the drain chamber in which the other ends of the actuation cylinders of the filter units in the respective groups are located may be divided for the respective groups.

Effects of the Invention

According to the first aspect of the present invention, in the filter element that is provided inside the filtration chamber, the fluid passes from the inside to the outside and is filtered. By the backwash slide member that is provided inside the filter element in a manner such that the outer circumferential portion of the backwash slide member slides in contact with the inner circumferential surface of the filter element and in a manner capable of moving backward and forward in the axial direction of the filter element, the trapped matter adhering to the inner circumferential surface of the filter element is removed by means of the inward flow generated by the difference in pressure inside and outside the filter element at the time of backwashing. By the backwash pipe, the base end of which is connected with the one side surface of the backwash slide member, and that is provided with the piston member at the other end of the backwash pipe, and provided with at least one aperture portion at a location in contact with the fluid flowing passage formed in the backwash pipe in the axial direction thereof, the aperture portion having the opening smaller than the cross-sectional area of the fluid flowing passage, the inward flow generated in the backwash slide member at the time of the backwashing can flow out toward the drain chamber. The fluid flowing unit allows the fluid flow into and out of the actuation cylinder, in which the piston member provided on the backwash pipe is fitted from the one end of the actuation cylinder in a manner such that the piston member is capable of moving backward and forward, to move the backwash slide member backward and forward inside the filter element, the other end of the actuation cylinder extending into the drain chamber. The fluid flowing unit enables the piston member of the backwash pipe fitted in the actuation cylinder to move backward and forward inside the actuation cylinder. By carrying out the backwashing by setting the pressure at the fluid outlet from the filtration chamber to be higher than the normal pressure, by setting the pressure at the fluid inlet to the fluid inflow chamber to be higher than the pressure at the fluid outlet, and by opening and closing the drain outlet of the drain chamber to the lower pressure side than the pressure at the fluid outlet, the fluid from the backwash pipe can flow toward the drain chamber, and the trapped matter separated by filtration in the filtration chamber can be discharged outside from the drain chamber.

In this case, all that needs to be done for movement of the backwash slide member which removes the trapped matter adhering to the inner circumferential surface of the filter element is to let the fluid flowing unit allow the fluid to freely flow into and out of the actuation cylinder and to set the drain chamber to be in a discharge state. Thus, a complicated mechanical structure is not required. Accordingly, it is possible to simplify a structure for backwashing, which removes trapped matter adhering to an inner circumferential surface of a filter element due to filtration, and to improve backwash efficiencies of the filter element. Furthermore, the actuation cylinder not only functions as a cylinder in which the piston member of the backwash pipe moves backward and forward, but also functions as a drain pipe which lets the fluid from the backwash pipe flow toward the drain chamber. This enables reduction in number of parts and space saving. Accordingly, the size of the overall apparatus can be reduced.

Furthermore, according to the second aspect of the present invention, by arranging, in the casing, the at least two filter units in parallel, each of which is formed by integrally combining the filter element, the backwash slide member, the backwash pipe, the actuation cylinder, and the fluid flowing unit according to the first aspect of the present invention, the processing rate of filtration can be increased. Furthermore, by individually controlling the at least two filter units arranged in parallel, the drain rate and the backwash efficiencies can be improved. Furthermore, a larger filtration area can be obtained with the same capacity.

BRIEF DESCRIPTION OF THE DRAWINGS

FIG. 3A is a left side view of FIG. 2 illustrating a first disk-shaped member, and FIG. 3B is a right side view of FIG. 2 illustrating a second disk-shaped member.

FIG. 9A is a left side view of the first disk-shaped member, FIG. 9B is a cross-sectional view along the line X-X in FIG. 9A, FIG. 9C is a right side view of the second disk-shaped member, and FIG. 9D is a cross-sectional view along the line Y-Y in FIG. 9C.

REFERENCE SYMBOL LIST

Figure 1:
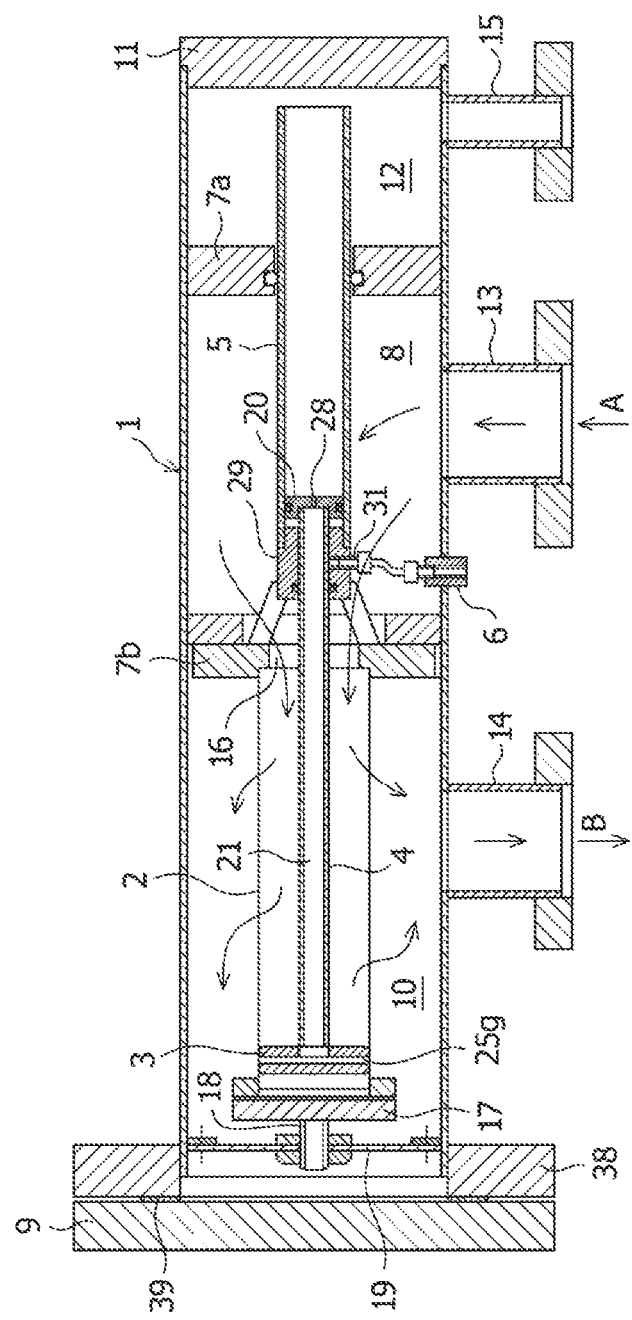
FIG. 1 is a central vertical cross-sectional view illustrating an embodiment of a filter apparatus according to a first aspect of the present invention and states of respective components.

1 Casing
2 Filter element
3 Backwash slide member
$3_1$ First backwash slide member
$3_2$ Second backwash slide member
3a First disk-shaped member
3b Second disk-shaped member
4 Backwash pipe
5 Actuation cylinder
6 Fluid flowing unit
8 Fluid inflow chamber
10 Filtration chamber
12, 12a, 12b, 12c Drain chamber
13 Fluid inlet
14 Fluid outlet
15, 15a, 15b, 15c Drain outlet
20 Piston member
21 Fluid flowing passage
24 Coupling hole
25 Spacer
25g Gap
28 Aperture portion
29 Closing member
30 Space
34 Brush
35, 36 Fluid passing openings
37 Edge member
40 Filter unit
41a First division plate
41b Second division plate

MODE FOR CARRYING OUT THE INVENTION

Hereinbelow, embodiments of the present invention will be described in detail with reference to the accompanying drawings.

FIG. 1 illustrates an embodiment of a filter apparatus according to a first aspect of the present invention. This filter apparatus is applied to filtration of liquid for general industrial use such as cooling water for various apparatuses and process liquid, filtration of oil such as lubricating oil and diesel fuel oil, filtration of gas and the like of various raw materials for use in a chemical plant and the like, and filtration of ballast water for ships. While the filter apparatus traps and removes fine particles, dust, and the like contained therein, the filter apparatus can be subjected to backwashing, which removes trapped matter adhering to an inner circumferential surface of a filter element. As illustrated in FIG. 1, the filter apparatus includes a casing 1, a filter element 2, a backwash slide member 3, a backwash pipe 4, an actuation cylinder 5, and a fluid flowing unit 6.

The casing 1 acts as an outer shell of the filter apparatus. The casing 1 is formed in a tubular shape (for example, a cylindrical shape), a rectangular parallelepiped shape, or the like, closed at one end and the other end. The casing 1 has a sealed space therein. An inside of the casing 1 is divided into three chambers by a first partition plate 7a and a second partition plate 7b arranged at two locations in the middle in a longitudinal direction of the casing 1. Between the first partition plate 7a and the second partition plate 7b, a fluid inflow chamber 8 into which a target fluid flows from outside is provided. Between the second partition plate 7b and an end plate 9 disposed at the one end, a filtration chamber 10 in which the target fluid flowing in from the fluid inflow chamber 8 is filtered and flows outside, is provided. Between the first partition plate 7a and an end plate 11 disposed at the other end, a drain chamber 12 through which trapped matter separated by filtration in the filtration chamber 10 is discharged to the outside is provided. A material for the casing 1 may be a metal, a synthetic resin, or the like, and the shape and the size thereof may be appropriately determined in accordance with intended use of the filter apparatus, the kind and the amount of liquid, gas, or the like passing through the filter apparatus, the location to install the filter apparatus, and the like.

At a part of the fluid inflow chamber 8, a fluid inlet 13 is provided. This fluid inlet 13 is in a pipe shape projecting outward. A tip end of the fluid inlet 13 is in a flange shape, with which a fluid supply tube (not shown) is connected. Furthermore, at a part of the filtration chamber 10, a fluid outlet 14 is provided. This fluid outlet 14 is in a pipe shape projecting outward. A tip end of the fluid outlet 14 is in a flange shape, with which a filtered fluid discharge tube (not shown) is connected. Furthermore, at a part of the drain chamber 12, a drain outlet 15 is provided. This drain outlet 15 is in a pipe shape projecting outward. A tip end of the drain outlet 15 is in a flange shape, with which a trapped matter discharge tube (not shown) is connected. At a center part of the second partition plate 7b, for example, a circular through hole 16 is formed.

Inside the filtration chamber 10, the filter element 2 is provided. This filter element 2 lets the target fluid pass therethrough to filter the fluid and to trap solid matter, accreted dust, and the like contained in the fluid. The filter element 2 is overall formed in a cylindrical shape. The filter element 2 is closed at one end thereof, and is open at the other end thereof located closer to the fluid inflow chamber 8, and lets the fluid pass therethrough from an inside to an outside to perform filtration. That is, in this filter element 2, the one end located on the left side in FIG. 1 is held and closed by a sealing member 17, and the other end located on the right side and open is coupled with the through hole 16 of the second partition plate 7b.

The sealing member 17 of the filter element 2 functions not only to close the one end of the filter element 2 but also to keep a shape of the filter element 2. A support shaft 18 projecting leftward from a center part of the sealing member 17 is supported by an anti-vibration plate 19 provided close to the end plate 9 disposed at the one end of the casing 1. Thus, the one end of the filter element 2 is supported inside the filtration chamber 10 with use of a buffering effect of the anti-vibration plate 19. In FIG. 1, a ring-like flange 38 is provided at an outer circumference of the one end of the casing 1, and a ring-like packing 39 lies between the end plate 9 and the flange 38. It is to be noted that the way to seal the filter element 2 is illustrative only, and that the other end of the filter element 2 coupled with the through hole 16 of the second partition plate 7b may be detachable. At the very least, this filter element 2 performs filtration and enables the below-mentioned backwash slide member 3 to be operated therein.

The filter element 2 may be formed by sintering multiple metal wires to enhance shape retention and formed in a cylindrical shape, or may be made of a metal-fiber-made or resin-made nonwoven fabric, and/or metal wire or a resin-made mesh. Furthermore, the filter element 2 may be a cylindrical notch wire filter element, a wedge wire filter element, a perforated plate member, or the like. The metal-fiber-made nonwoven fabric is prepared by laminating and sintering metal fibers and functions to adsorb and remove dust and the like contained in the fluid to be filtered, to obtain a cleaned fluid. Furthermore, the metal wire functions to carry out filtration in some cases and functions as a shape retention material or a surface protection material for the metal-fiber-made nonwoven fabric in other cases. The shape, the size, the amount, and the like of the filter element 2 may be appropriately determined in accordance with intended use of the filter apparatus, the filtering performance, the size of the casing 1, the kind of the target fluid, and the like.

Inside the filter element 2, the backwash slide member 3 is provided in a manner capable of moving backward and forward in an axial direction of the filter element 2. An outer circumferential portion of this backwash slide member 3 slides in contact with the inner circumferential surface of the filter element 2, and the backwash slide member 3 in the filter element 2 removes the trapped matter adhering to the inner circumferential surface of the filter element 2, by means of an inward flow generated by a difference in pressure inside and outside at the time of the backwashing. The backwash slide member 3 is made of a metal or the like and is formed to be a disk-shaped member. The backwash slide member 3 has within a thickness thereof a gap in which the fluid flows inward from the outer circumferential portion to a center portion thereof due to the difference in pressure inside and outside the filter element 2, and this gap communicates with a fluid flowing passage of the below-mentioned backwash pipe 4. An outside diameter of the disk-shaped member has a size that causes the member to be fitted in the inner circumference of the cylindrical filter element 2 and that enables the member to slide in contact with the inner circumferential surface of the cylindrical filter element 2.

On one side surface of the backwash slide member 3, the backwash pipe 4 is connected. This backwash pipe 4 lets the inward flow generated in the backwash slide member 3 flow out toward the drain chamber 12. The backwash pipe 4 is overall formed in a linear shape with a base end thereof connected with the one side surface of the backwash slide member 3 and with the other end thereof provided with a piston member 20, and at least one aperture portion 28 is provided at a location, such as an outlet side, in contact with a fluid flowing passage 21 formed in the backwash pipe 4 an axial direction thereof. The aperture portion 28 has an opening smaller than a cross-sectional area of the fluid flowing passage 21. This aperture portion 28 limits flow rate of backwash fluid flowing through the fluid flowing passage 21 toward the drain chamber 12 and thus limits a pressure loss caused by pipes of the drain chamber 12 and downstream components. For example, the aperture portion 28 includes an opening.

Figure 2:
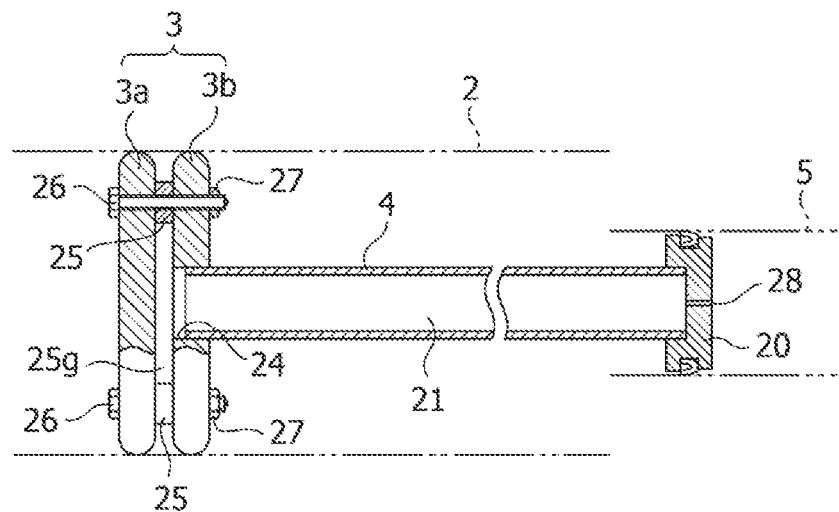
FIG. 2 is an enlarged cross-sectional view illustrating partial cross-sections of a backwash slide member and a backwash pipe of the filter apparatus.
Figure 3A:
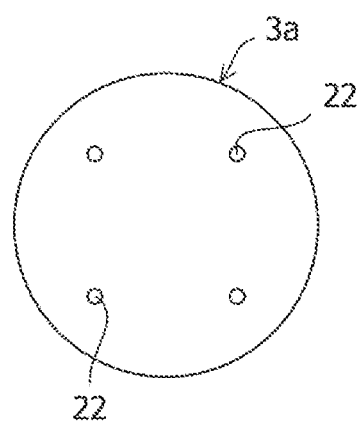
FIGS. 3A and 3B are side views illustrating two disk-shaped members constituting the backwash slide member.
Figure 3B:
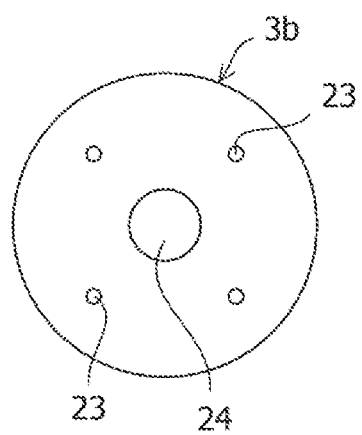

Specific shapes and structures of the backwash slide member 3 and the backwash pipe 4 are illustrated in FIGS. 2, 3A and 3B. FIG. 2 is an enlarged cross-sectional view illustrating partial cross-sections of the backwash slide member 3 and the backwash pipe 4. FIGS. 3A and 3B are side views illustrating two disk-shaped members constituting the backwash slide member 3.

In FIG. 2, the backwash slide member 3 includes combination of a first disk-shaped member 3a having a predetermined thickness and a second disk-shaped member 3b similarly having a predetermined thickness. As illustrated in FIG. 3A, the first disk-shaped member 3a has bolt holes 22, into which bolts are inserted, at, for example, half to quarter locations in a circumferential direction thereof at locations close to an outer circumferential portion thereof. As illustrated in FIG. 3B, the second disk-shaped member 3b similarly has bolt holes 23, into which bolts are inserted, at locations corresponding to the bolt holes 22 of the first disk-shaped member 3a, and has a coupling hole 24 at a center portion thereof, the coupling hole 24 having an inside diameter enabling the backwash pipe 4 to be fitted thereinto.

As illustrated in FIG. 2, the abovementioned two disk-shaped members 3a, 3b are combined so that a spacer 25 lies therebetween, bolts 26 are inserted into the bolt holes 22, 23, and nuts 27 are screwed on the other ends of the bolts 26. Thus, in the backwash slide member 3, the two disk-shaped members 3a, 3b are combined in parallel with each other, leaving a space therebetween so that the width of the space becomes equal to that of the spacer 25, as a gap 25g, in which the inward flow from the outer circumferential portion to the center portion is generated, and which is formed within the thickness of the disk-shaped members (3a, 3b).

In FIG. 2, the base end of the backwash pipe 4 is connected with the coupling hole 24 perforated in the second disk-shaped member 3b of the backwash slide member 3 by welding or the like, and the backwash pipe 4 is provided with the fluid flowing passage 21 extending in the axial direction thereof. Furthermore, to the other end of the backwash pipe 4, the piston member 20 is secured by welding or the like. This piston member 20 is fitted in the below-mentioned actuation cylinder 5, to move the backwash slide member 3 backward and forward inside the filter element 2. An outside diameter of the piston member 20 has a size that causes the member to be fitted in an inner circumference of the actuation cylinder 5 and that enables the member to slide in contact with an inner circumferential surface of the actuation cylinder 5. At a center portion of the piston member 20, the aperture portion 28 which has the opening on the same axis as that of the fluid flowing passage 21 is provided. Accordingly, by this backwash pipe 4, the piston member 20 can move the backwash slide member 3 backward and forward inside the filter element 2, and the fluid which flows inward in the gap 25g of the backwash slide member 3 can flow out toward the drain chamber 12.

In FIG. 1, the piston member 20 of the backwash pipe 4 is fitted in the actuation cylinder 5 in a manner capable of moving backward and forward. This actuation cylinder 5 causes the backwash slide member 3 to move backward and forward inside the filter element 2 and lets the fluid from the backwash pipe 4 flow toward the drain chamber 12. One end of the actuation cylinder 5 is located in the fluid inflow chamber 8, and the piston member 20 provided on the backwash pipe 4 is fitted in the actuation cylinder 5 from the one end thereof in a manner capable of moving backward and forward. The other end extends linearly into the drain chamber 12.

Figure 4:
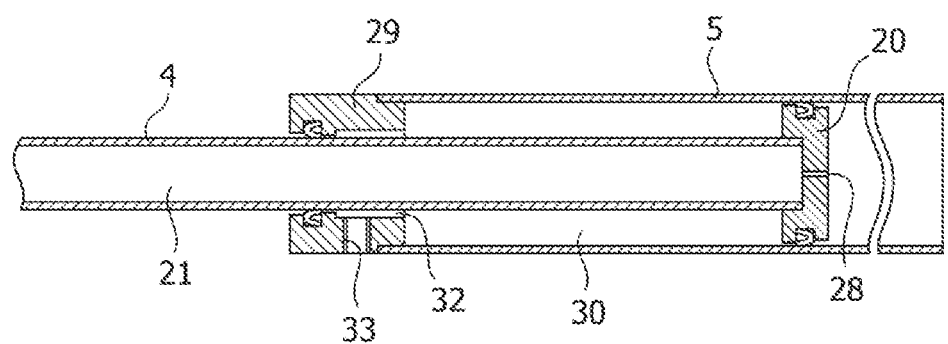
FIG. 4 is an enlarged cross-sectional view illustrating structures of the backwash pipe, and an actuation cylinder and a closing member of the filter apparatus.

Specific shape and structure of the actuation cylinder 5 are illustrated in FIG. 4. FIG. 4 is an enlarged cross-sectional view illustrating the backwash pipe 4 and the actuation cylinder 5. To this actuation cylinder 5, a closing member 29 is attached at one end of the actuation cylinder 5 on the left side in FIG. 4, to prevent leakage of the fluid from the one end. At a center portion of this closing member 29, an opening in which the backwash pipe 4 is fitted is provided, and the backwash pipe 4 is fitted in the opening in a manner capable of moving backward and forward. At an inner circumference of the opening in which the backwash pipe 4 is fitted, a seal material is disposed to be interposed between the inner circumference surface and the backwash pipe 4. Furthermore, the piston member 20 attached to the backwash pipe 4 is fitted in the actuation cylinder 5 on the other end side thereof. Thus, inside the actuation cylinder 5, a space 30 is formed between the closing member 29 and the piston member 20. The other end of the actuation cylinder 5 illustrated on the right side in FIG. 4 extends into the drain chamber 12 and is open as illustrated in FIG. 1. Accordingly, the fluid which is guided to flow inward in the gap 25g of the backwash slide member 3 illustrated in FIG. 1 passes through the fluid flowing passage 21 of the backwash pipe 4 and the aperture portion 28 of the piston member 20, and the actuation cylinder 5, toward the drain chamber 12.

To the closing member 29 of the actuation cylinder 5, the fluid flowing unit 6 is connected as illustrated in FIG. 1. This fluid flowing unit 6 allows a fluid to flow into and out of the actuation cylinder 5, to enable the piston member 20 of the backwash pipe 4 fitted in the actuation cylinder 5 to move backward and forward inside the actuation cylinder 5. The fluid flowing unit 6 may be formed by components that allow the fluid to freely flow into and out of the actuation cylinder 5, such as a pipe or a tube. A fitting 31 at a tip end of the fluid flowing unit 6 is connected with a part of the closing member 29. The fluid flowing unit 6 acts as a fitting opened to normal pressure (for example, atmospheric pressure). It is to be noted that the fluid flowing unit 6 is not limited to one opened to atmospheric air and may be connected with a pipe through which normal-pressure liquid such as water and oil flows.

A structure of the closing member 29 with which the fitting 31 of the fluid flowing unit 6 is connected will be described with reference to FIG. 4. In FIG. 4, the opening provided at the center portion of the closing member 29 has a larger inside diameter at a right half part thereof on the side of the space 30 defined in the actuation cylinder 5, the inside diameter being larger than an outside diameter of the backwash pipe 4, and a gap 32 is formed between the right half part and an outer circumferential surface of the backwash pipe 4. This gap 32 communicates with the space 30 defined in the actuation cylinder 5. Furthermore, at a part of the closing member 29, a flowing passage 33 is formed within a thickness of the closing member 29, and a female screw is provided on an inner circumferential surface of the flowing passage 33. In this state, as illustrated in FIG. 1, a male screw of the fitting 31 of the fluid flowing unit 6 is screwed into the flowing passage 33 to connect the fluid flowing unit 6 with the part of the closing member 29. Accordingly, by this fluid flowing unit 6, the fluid can freely flow into and out of the space 30 defined between the closing member 29 provided at the one end of the actuation cylinder 5 and the piston member 20 of the backwash pipe 4 fitted in the actuation cylinder 5. That is, the fluid can freely flow into and out of the space 30.

In the abovementioned configuration of the filter apparatus, pressure (that is, pressure on an outlet side of the filter element 2) at the fluid outlet 14 from the filtration chamber 10 is set to be higher than normal pressure (for example, atmospheric pressure), and pressure (that is, pressure on an inlet side of the filter element 2) at the fluid inlet 13 to the fluid inflow chamber 8 is set to be higher than the pressure at the fluid outlet 14. In order to set the pressure at the fluid outlet 14 to be higher than the normal pressure, pipe resistance on a downstream side of the fluid outlet 14 has only to be increased. Examples of this are narrowing down an outlet valve, providing a back pressure valve, and raising the pipe to increase a head (hydraulic head). Furthermore, in order to set the pressure at the fluid inlet 13 to be higher than the pressure at the fluid outlet 14, a pressure difference (differential pressure) to be generated when the fluid passes from the inside to the outside of the filter element 2 has only to be added to the outlet pressure. That is, the target fluid has only to be supplied to achieve "inlet pressure=outlet pressure+filter differential pressure." In this state, by opening and closing the drain outlet 15 of the drain chamber 12 to a lower pressure side than the pressure at the fluid outlet 14, filtration and backwashing of the filter element 2 are carried out.

Next, operations of the filter apparatus configured as mentioned above will be described with reference to FIGS. 1, 5, and 6. FIG. 1 illustrates states of the filter element 2, the backwash slide member 3, the backwash pipe 4, and the actuation cylinder 5 in the casing 1 at the time of filtration. In this state, the backwash slide member 3 is located at the one end, which is the leftmost side in the filter element 2, the piston member 20 of the backwash pipe 4 is located at the one end, which is the leftmost side in the actuation cylinder 5, and the drain outlet 15 is closed by a valve or the like (not shown). This is an initial state.

At the time of filtration, in FIG. 1, a target fluid flows in from the outside through the fluid inlet 13 of the casing 1 in a direction of the arrow A and flows out through the fluid outlet 14 to the outside in a direction of the arrow B. At this time, the target fluid flows into the fluid inflow chamber 8 through the fluid inlet 13, and flows to the left side in FIG. 1 inside the fluid inflow chamber 8, and then, flows into the filter element 2 via the through hole 16 formed in the second partition plate 7*b*, and then, is filtered as the target fluid passes through the filter element 2 from the inside to the outside. The filtered fluid flows into the filtration chamber 10 located outside the filter element 2 and flows out of the filtration chamber 10 to the outside through the fluid outlet 14 as a filtered fluid.

As such filtration is continued, solid matter, accreted dust, and the like contained in the target fluid are trapped on the filter element 2 and accumulate on the filter element 2 to cause clogging. In a case of the clogging, in order to restoring filtering performance of the filter element 2, the backwashing for removing trapped matter adhering to the filter element 2 is carried out.

Figure 5:
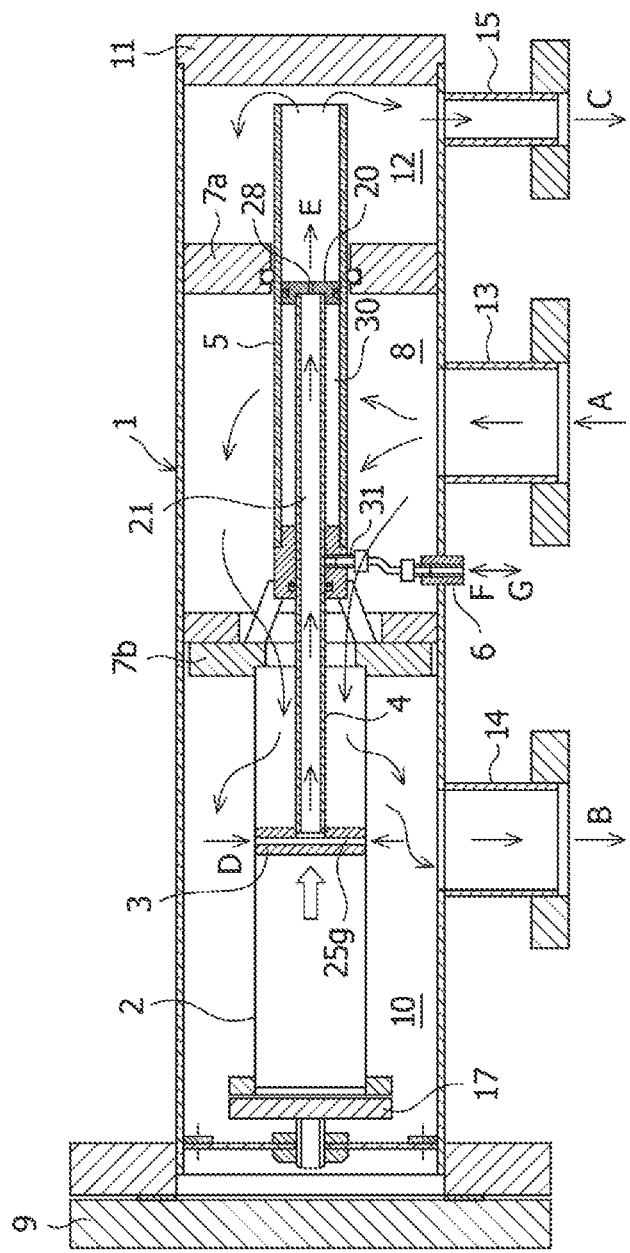
FIG. 5 illustrates operation states of a filter element, the backwash slide member, the backwash pipe, the actuation cylinder, and a fluid flowing unit at the time of backwashing.

FIG. 5 illustrates operation states of the filter element 2, the backwash slide member 3, the backwash pipe 4, the actuation cylinder 5, and the fluid flowing unit 6 in the casing 1 at the time of the backwashing. At the time of the backwashing, while the fluid flows in through the fluid inlet 13 in the direction of the arrow A and flows out through the fluid outlet 14 in the direction of the arrow B, the drain outlet 15 opened to normal pressure (for example, atmospheric pressure) is opened to make a fluid in the drain chamber 12 flow out to the outside in a direction of the arrow C. At this time, due to the outflow of the fluid in the drain chamber 12 to the outside, pressure at the gap 25*g* of the backwash slide member 3 becomes lower than pressure at the outside of the filter element 2, because the inside of the actuation cylinder 5, the aperture portion 28 of the piston member 20, the fluid flowing passage 21 of the backwash pipe 4, and the gap 25*g* of the backwash slide member 3 communicate with each other. By this difference in pressure inside and outside, an inward flow in a direction of the arrow D from the outside to the inside of the filter element 2 is generated in the gap 25*g*, so that the backwashing for removing the trapped matter adhering to the inner circumferential surface of the filter element 2 is started, and a backwash fluid flows out through the opening of the aperture portion 28.

The removed trapped matter flows out in a direction of the arrow E passing through the gap 25*g* of the backwash slide member 3, the fluid flowing passage 21 of the backwash pipe 4 and the aperture portion 28 of the piston member 20, and then the removed trapped matter enters the drain chamber 12 via the actuation cylinder 5, and is discharged from the drain chamber 12 to the outside in the direction of the arrow C. A pressure difference between the fluid inlet 13 and the fluid outlet 14 when the backwashing is started is, for example, approximately 10 kPa to 100 kPa. However, the pressure difference is not limited to this range and may be appropriately changed and designed in accordance with the target fluid to be filtered.

At the time of the backwashing illustrated in FIG. 5, rightward movement of the backwash slide member 3 in the filter element 2 is caused by a difference between pressure at the drain chamber 12 and pressure at a space between the first disk-shaped member 3*a* of the backwash slide member 3 and the sealing member 17. The pressure difference is preferably as large as possible. To do this, the pressure at the fluid outlet 14 has only to be increased. Examples of this are narrowing down an outlet valve, providing a back pressure valve, and raising the pipe to increase a head (hydraulic head). By the fluid flowing unit 6, the fluid is allowed to flow into and out of the actuation cylinder 5 freely in directions of the arrows F, G, and thus, as illustrated in FIG. 4, the piston member 20 of the backwash pipe 4 fitted in the actuation cylinder 5 can freely move backward and forward in the actuation cylinder 5. Accordingly, due to the above-mentioned pressure difference, the entirety of the backwash slide member 3 moves rightward in the filter element 2.

At this time, the outer circumferential portion of the backwash slide member 3 slides in contact with the inner circumferential surface of the filter element 2 while the inward flow is generated from the outside toward the inside of the filter element 2, so that the backwashing is carried out, removing the trapped matter adhering to the inner circumferential surface of the filter element 2. In this manner, the backwashing is carried out until the backwash slide member 3 reaches the other end on the right side of the filter element 2. At the time of the backwashing, the filtration by the filter element 2 cannot be carried out efficiently on the left side of the backwash slide member 3. However, by adopting a below-mentioned structure illustrated in FIGS. 9A to 9D, the filtration can be carried out continuously in a manner similar to that illustrated in FIG. 1.

Figure 6:
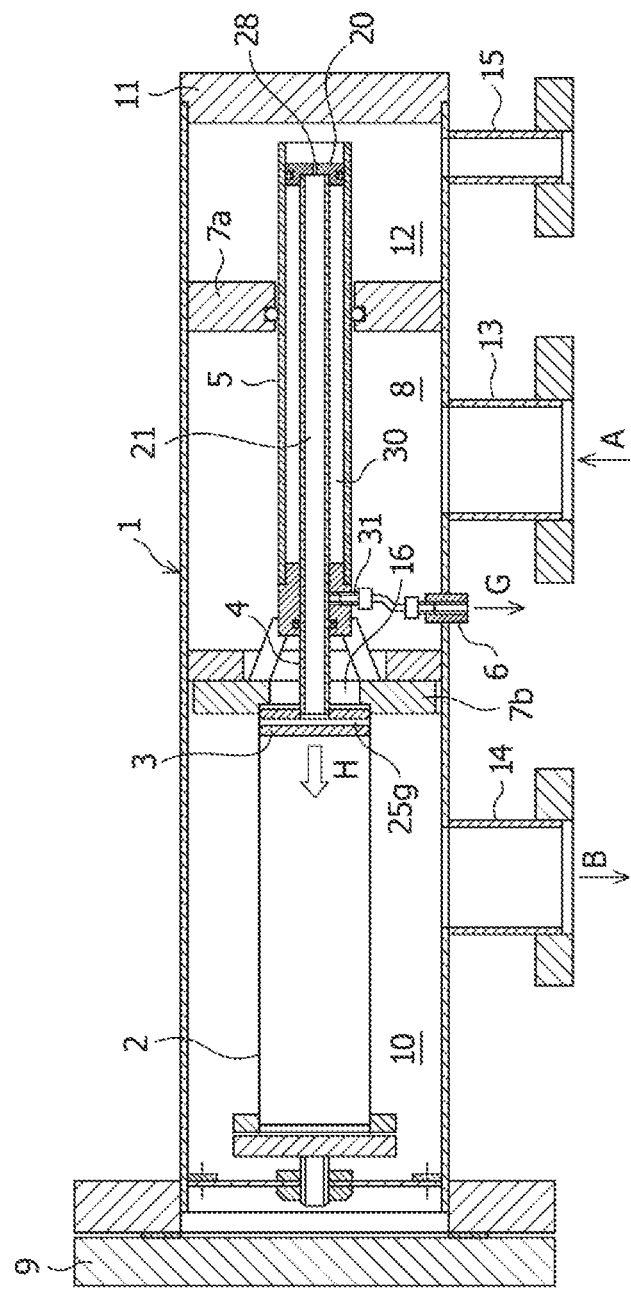
FIG. 6 illustrates an operation state of the fluid flowing unit when the backwash slide member is returned to an initial state subsequent to the operation illustrated in FIG. 5.

FIG. 6 illustrates an operation state when the backwash slide member 3 is returned to the initial state subsequent to the operation illustrated in FIG. 5. In this state, the backwash slide member 3 is located at the other end on the rightmost side in the filter element 2, and the piston member 20 of the backwash pipe 4 is located at the other end on the rightmost side in the actuation cylinder 5. Such a state is a state in which the backwash slide member 3 blocks the through hole 16 of the second partition plate 7b. In this state, it may be difficult for the target fluid to pass through the through hole 16 and flow into the filter element 2 as illustrated in FIGS. 1 and 5, so that the filtration by the filter element 2 cannot be carried out. Thus, the backwash slide member 3 may need to be returned to the initial state illustrated in FIG. 1.

In this case, in a state in which the fluid is allowed to flow in through the fluid inlet 13 in the direction of the arrow A and the fluid is allowed to flow out through the fluid outlet 14 in the direction of the arrow B, the drain outlet 15 is closed. As a result, discharge of the fluid from the drain chamber 12 is stopped. In other words, by stopping a valve connected to the drain outlet 15, the pressure at the filtration chamber 10 becomes equal to the pressure at the drain chamber 12, since the filtration chamber 10 and the drain chamber 12 communicate with each other, and the flow passing through the aperture portion 28 of the piston member 20 stops. However, only a fluid with a volume equal to the volume of the fluid flowing passage 21 of the backwash pipe 4 and the space 30 in the actuation cylinder 5 flows. At this time, the piston member 20 receives the pressure at the drain chamber 12. Since the fluid flowing unit 6 is opened to, for example, atmospheric air, the fluid in the space 30 in the actuation cylinder 5 is discharged outside in the direction of the arrow G by the pressure at the drain chamber 12. Furthermore, since the fluid flows in through the fluid inlet 13, the pressure difference caused by the fluid flowing into the filter element 12 through the through hole 16 formed in the second partition plate 7b also acts. As a result, the entirety of the backwash slide member 3 moves leftward in a direction of the arrow H inside the filter element 2. In this manner, the backwash slide member 3 moves until it reaches the one end on the left side of the filter element 2. Thus, the backwash slide member 3 is returned to the initial state illustrated in FIG. 1. Then, the filtration of the target fluid is carried out as illustrated in FIG. 1, and the backwashing of the filter element 2 is carried out as illustrated in FIG. 5.

It is to be noted that, in the case of FIG. 6, the drain outlet 15 may be slightly opened, and that the backwash slide member 3 may be returned while carrying out the backwashing of the filter element 2 illustrated in FIG. 5. In this case, by controlling the pressure at the filtration chamber 10, the pressure at the fluid inflow chamber 8, the pressure at the drain chamber 12, or the rate of the fluid flowing in through the fluid flowing unit 6, movement of the backwash slide member 3 and a state of the backwashing can be controlled.

Figure 7:
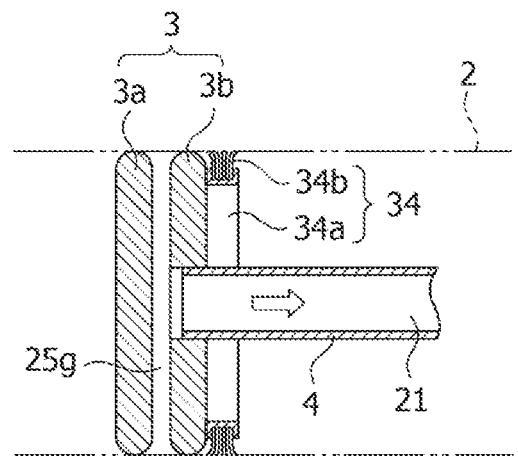
FIG. 7 is an enlarged cross-sectional view of a main part illustrating a second embodiment of the backwash slide member.

FIG. 7 is an enlarged cross-sectional view of a main part illustrating a second embodiment of the backwash slide member 3. In the present embodiment, a brush 34 which slides in contact with the inner circumferential surface of the filter element 2 over the entire circumference thereof is provided along an outer circumferential portion of one side surface or each of side surfaces of the disk-shaped members (3a, 3b). This brush 34 moves together with the backwash slide member 3 when the backwash slide member 3 moves backward and forward inside the filter element 2 in the axial direction of the filter element 2, to scrape away trapped matter adhering to the inner circumferential surface of the filter element 2. As illustrated in FIG. 7, the brush 34 is formed by attaching brush bristles 34b to an outer circumferential portion of a channel ring 34a and is called a ring brush. The channel ring 34a is made of a channel material, made of, for example, a metal, having a substantially U-shaped cross-section, formed in a ring shape having a smaller outside diameter than an inside diameter of the filter element 2. To the substantially U-shaped recess at the outer circumference of this channel ring 34a, the brush bristles 34b are attached in a ring shape so that the tip of the brush bristles 34b can slide in contact with the inner circumferential surface of the filter element 2. The brush bristles 34b are required to have at least a length which allows the tip ends of the brush bristles 34b to come into contact with the inner circumferential surface of the filter element 2 with a certain pressure. A material for the brush bristles 34b may be anything that is generally used as brush bristles, such as natural or synthetic fibers, or metal wires of steel, copper or brass. By connecting the channel ring 34a with the right side surface of the second disk-shaped member 3b by welding, the brush 34 is attached.

It is to be noted that, as an alternative of the brush 34, anything that can slide in contact with the inner circumferential surface of the filter element 2 with an outer circumferential member thereof to remove trapped matter, such as a scraper made of metal, resin, or rubber, formed in a blade shape or a paddle shape, may be used.

In the present embodiment, in a case in which a target fluid to be filtered contains a large amount of viscous dust and fibrous dust, the backwashing can be carried out using the inward flow in the gap 25g of the backwash slide member 3 generated by a difference in pressure inside and outside, while scraping away the trapped matter adhering to the inner circumferential surface of the filter element 2 with the brush 34. It is to be noted that, in FIG. 7, the brush 34 is provided on the right side surface of the second disk-shaped member 3b of the backwash slide member 3, but the brush 34 may be provided on the left side surface of the first disk-shaped member 3a or on each side surface of the backwash slide member 3. In any case, a positional relationship in which the fluid flows inward in the gap 25g of the backwash slide member 3 while the trapped matter on the filter element 2 is scraped away by the brush 34 is preferable. Furthermore, when the brush 34 is provided on each side surface of the backwash slide member 3, the brushes 34 may also function as a sealing structure for the gap 25g.

Figure 8:
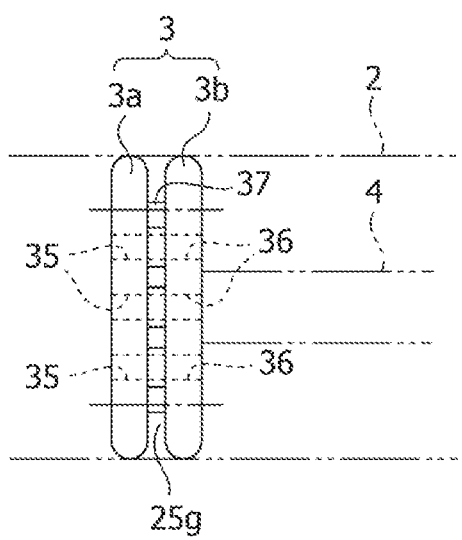
FIG. 8 is an enlarged cross-sectional view of a main part illustrating a third embodiment of the backwash slide member.

FIG. 8 is an enlarged schematic view of a main part illustrating a third embodiment of the backwash slide member 3. In the present embodiment, at least one fluid passing opening (35, 36) penetrating from one side surface to the other side surface is arranged on the disk surfaces of the disk-shaped members (3a, 3b) and on a portion except for a connecting portion with the fluid flowing passage 21. That is, in a state in which the gap 25g is formed between the first disk-shaped member 3a and the second disk-shaped member 3b, the fluid passing openings 35, 36 penetrating through the first disk-shaped member 3a and the second disk-shaped member 3b are formed. In this case, the fluid passing openings 35, 36 do not communicate with the fluid flowing passage 21 illustrated in FIG. 2.

Figure 9A:
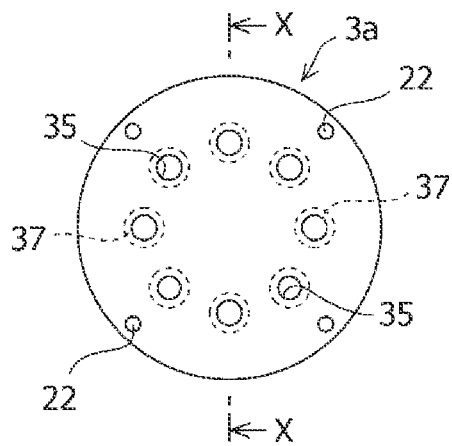
FIGS. 9A to 9D illustrate shapes and structures of the first and second disk-shaped members in the backwash slide member according to the third embodiment.
Figure 9B:
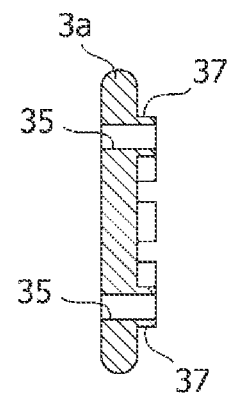

FIGS. 9A to 9D illustrate shapes and structures of the first and second disk-shaped members 3a, 3b in the backwash slide member 3 according to the third embodiment. FIG. 9A is a left side view of the first disk-shaped member 3a. In a manner similar to that of FIG. 3A, this first disk-shaped member 3a has the bolt holes 22, into which bolts are inserted at, for example, half to quarter locations in a circumferential direction thereof at locations close to an outer circumference thereof. On the inner side of the bolt holes 22 in a radial direction of the first disk-shaped member 3a, the at least two fluid passing openings 35 are formed at, for example, half to one-eighth locations in the circumferential direction of the first disk-shaped member 3a. As illustrated in FIG. 9B, on side surfaces of the fluid passing openings 35 facing the second disk-shaped member 3b, edge members 37 which project and surround outer circumferences of the respective fluid passing openings 35 are provided. A height of each edge member 37 is equal to a length of the spacer 25 illustrated in FIG. 2.

Figure 9C:
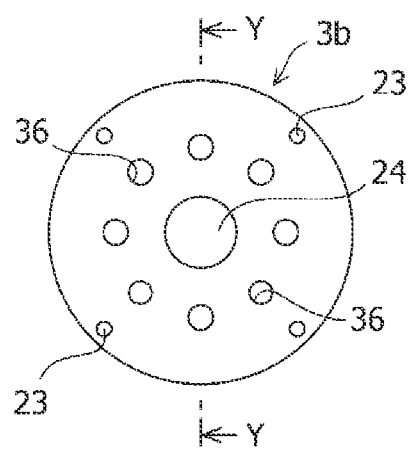
Figure 9D:
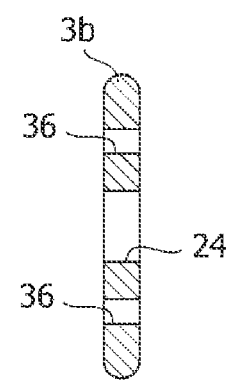

FIG. 9C is a right side view of the second disk-shaped member 3b. This second disk-shaped member 3b similarly has the bolt holes 23, into which bolts are inserted at locations corresponding to the bolt holes 22 of the first disk-shaped member 3a illustrated in FIG. 9A, and has the coupling hole 24 at the center portion thereof, the coupling hole 24 having an inside diameter enabling the backwash pipe 4 to be fitted thereinto. In an area on the inner side of the bolt holes 23 and the outer side of the coupling hole 24 in a radial direction of the second disk-shaped member 3b, the fluid passing openings 36 are similarly formed at locations corresponding to the respective fluid passing openings 35 of the first disk-shaped member 3a illustrated in FIG. 9A.

In such a state, as illustrated in FIG. 8, the first disk-shaped member 3a and the second disk-shaped member 3b face each other. In a manner similar to that of FIG. 2, the first disk-shaped member 3a and the second disk-shaped member 3b are combined so that the edge members 37 is located therebetween, the bolts 26 are inserted into the bolt holes 22, 23, and the nuts 27 are screwed on the other ends of the bolts 26. Thus, in the backwash slide member 3, the two disk-shaped members 3a, 3b are combined in parallel with each other, leaving a space therebetween so that the height of the space becomes equal to that of the edge member 37, as the gap 25g, in which the fluid flows inward due to the difference in pressure inside and outside from the outer circumferential portion to the center portion, and which is formed within the thickness of the disk-shaped members (3a, 3b).

In the present embodiment, at the time of the backwashing illustrated in FIG. 5, although the backwash slide member 3, which moves in a reverse direction of the flow, prevents the fluid from flowing in through the other end, which is open and located on the right side of the filter element 2, the flow of the fluid can pass through the respective fluid passing openings 35, 36. Thus, filtering can be continued even at the time of the backwashing. Furthermore, providing the fluid passing openings 35, 36 can restrict application of a pressure difference between the fluid inlet 13 and the fluid outlet 14 to the backwash slide member 3.

Figure 10:
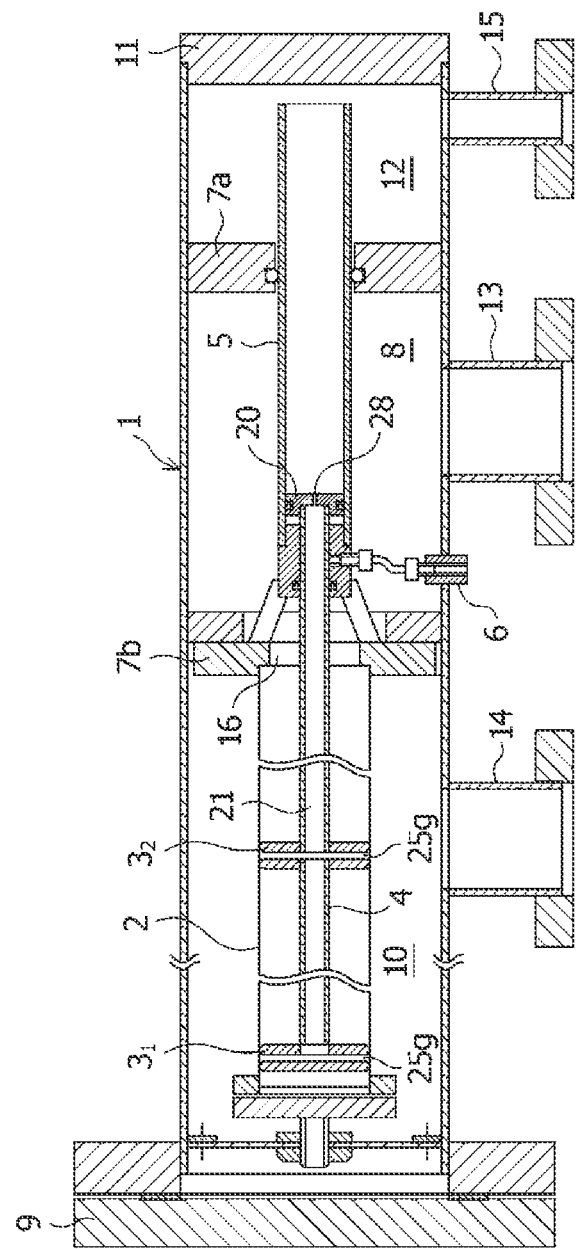
FIG. 10 is a central vertical cross-sectional view illustrating another embodiment of the filter apparatus according to the first aspect of the present invention.

FIG. 10 illustrates another embodiment of the filter apparatus according to the first aspect of the present invention. In the present embodiment, in the filter apparatus illustrated in FIG. 1 using the backwash slide member 3 according to the third embodiment illustrated in FIGS. 8 and 9A to 9D, the single backwash slide member ($3_1$) is provided at one end of the backwash pipe 4, and at least one additional backwash slide member ($3_2$), configured to allow the inward flow generated by the difference in pressure inside and outside the filter element 2 to enter the fluid flowing passage 21, is provided in the middle in the axial direction of the backwash pipe 4.

Specifically, the filter element 2 is set to be, for example, twice or three times as long as that in the case of FIG. 1, and the backwash pipe 4 is similarly set to be longer. A first backwash slide member $3_1$ having totally the same structure as that of the backwash slide member 3 illustrated in FIGS. 8 and 9A to 9D is provided at one end (the left side end in FIG. 10) of the backwash pipe 4, and a second backwash slide member $3_2$ is provided in the middle in the axial direction of the backwash pipe 4. In this case, the fluid flowing passage 21 provided in the axial direction of the backwash pipe 4 is required to continuously extend over the entire length, and thus the second backwash slide member $3_2$ is provided with the coupling hole 24 (refer to FIGS. 9C, 9D), which has an inside diameter enabling the backwash pipe 4 to be fitted in, at a center portion of the first disk-shaped member 3a illustrated in FIGS. 9A, 9B. The second backwash slide member $3_2$ is connected with the backwash pipe 4 by welding or the like, with the backwash pipe 4 inserted in the coupling hole 24. In FIG. 10, the single second backwash slide member $3_2$ is provided in the middle of the backwash pipe 4. However, it is to be noted that two or three or more members corresponding to the second backwash slide members $3_2$ may be provided at appropriate intervals to provide the two or three or more backwash slide members 3 in total including the first backwash slide member $3_1$.

According to the present embodiment, the filter element 2 can be twice or three times as long as that in the case of FIG. 1 without changing the length of the actuation cylinder 5. Accordingly, the processing rate of filtration can be increased with a small increase of the entire length of the apparatus. Furthermore, an increase in size of the apparatus can be achieved without increasing the number of other parts. Furthermore, the filter apparatus according to the present embodiment can be applied to a filter unit 40 in a filter apparatus according to a second aspect of the present invention illustrated in FIG. 15 mentioned below, and the processing amount of filtering can be further increased.

Figure 11:
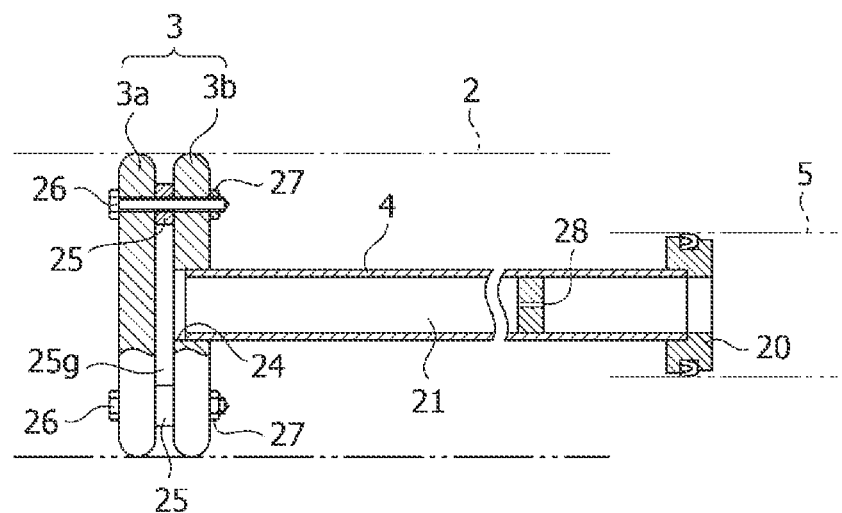
FIG. 11 is an enlarged cross-sectional view of a main part illustrating a second embodiment of the backwash pipe in the filter apparatus.

FIG. 11 is an enlarged cross-sectional view of a main part illustrating a second embodiment of the backwash pipe 4 in the filter apparatus according to the first aspect of the present invention. In the second embodiment, the aperture portion 28 is provided in the middle of the fluid flowing passage 21 of the backwash pipe 4. In this case, a blocking member which blocks the flow of the fluid is fitted in the middle of the fluid flowing passage 21 in the longitudinal direction thereof, and at a center portion of this blocking member, an opening (28) smaller than a cross-sectional area of the fluid flowing passage 21 is perforated. This aperture portion 28 has similar effects as those illustrated in FIG. 2.

Figure 12:
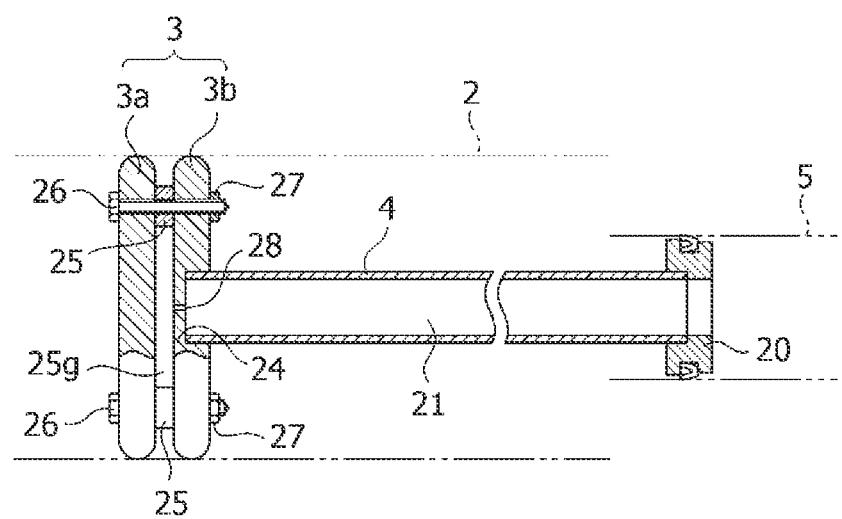
FIG. 12 is an enlarged cross-sectional view of a main part illustrating a third embodiment of the backwash pipe in the filter apparatus.

FIG. 12 is an enlarged cross-sectional view of a main part illustrating a third embodiment of the backwash pipe 4 in the filter apparatus. In the third embodiment, the aperture portion 28 is provided on an inlet side of the fluid flowing passage 21 of the backwash pipe 4. In this case, the second disk-shaped member 3b located on the inlet side of the fluid flowing passage 21 is formed as a closing lid, and at a center portion of this closing lid, an opening (28) smaller than a cross-sectional area of the fluid flowing passage 21 is perforated. This aperture portion 28 has similar effects as those illustrated in FIG. 2. The backwash pipes 4 according to the embodiments illustrated in FIGS. 11 and 12 may be applied to any of the filter apparatuses illustrated in FIGS. 1 and 10.

In FIGS. 2, 11, and 12, the aperture portion 28 is provided at one location in the fluid flowing passage 21 of the backwash pipe 4 in the longitudinal direction thereof. However, the present invention is not limited to this, and the aperture portions 28 may be provided at at least two locations in the fluid flowing passage 21 in the longitudinal direction thereof. Furthermore, as another embodiment of the aperture portion 28 illustrated in FIG. 2, 11, or 12, instead of providing the aperture portion 28 at least at one location in the fluid flowing passage 21 of the backwash pipe 4 in the longitudinal direction thereof, the gap 25g between the first disk-shaped member 3a and the second disk-shaped member 3b of the backwash slide member 3 may be narrowed to increase resistance of the fluid which passes through the gap 25g and flows inside the fluid flowing passage 21 of the backwash pipe 4 toward the drain chamber 12.

Figure 13:
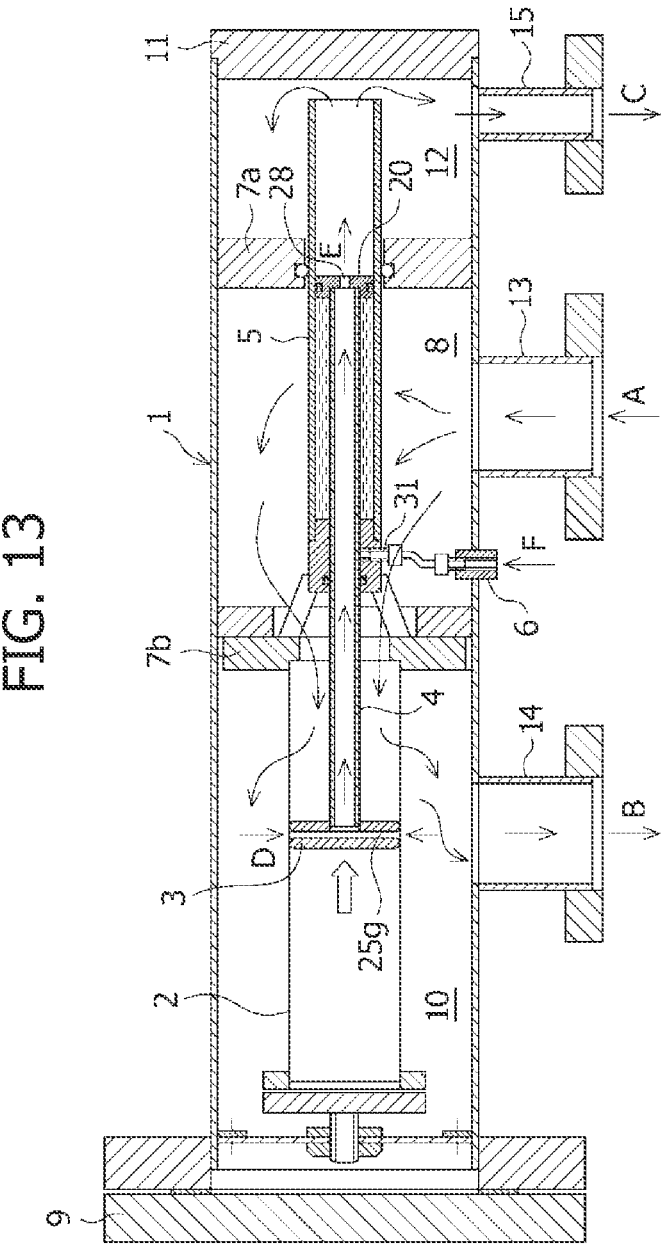
FIG. 13 illustrates other operation states of the filter element, the backwash slide member, the backwash pipe, the actuation cylinder, and the fluid flowing unit at the time of the backwashing.

FIG. 13 illustrates other operation states of the filter element 2, the backwash slide member 3, the backwash pipe 4, the actuation cylinder 5, and the fluid flowing unit 6 at the time of the backwashing. In the present embodiment, the fluid flowing unit 6 is configured to supply and discharge a control fluid into and from the space 30 (refer to FIG. 4) defined between the closing member 29 provided at the one end of the actuation cylinder 5 and the piston member 20 of the backwash pipe 4 fitted in the actuation cylinder 5. At the time of the backwashing, the drain outlet 15 is opened, to make the fluid in the drain chamber 12 flow out to the outside in the direction of the arrow C. At this time, due to the outflow of the fluid in the drain chamber 12 to the outside, pressure at the gap 25g of the backwash slide member 3 becomes lower than pressure at the outside of the filter element 2 because the inside of the actuation cylinder 5, the aperture portion 28 of the piston member 20, the fluid flowing passage 21 of the backwash pipe 4, and the gap 25g of the backwash slide member 3 communicate with each other, and accordingly, a difference in pressure inside and outside is generated. This pressure difference generates the inward flow in the direction of the arrow D, and the backwashing for removing the trapped matter adhering to the inner circumferential surface of the filter element 2 is started using the inward flow.

The removed trapped matter is flowed out in the direction of the arrow E passing through the gap 25g of the backwash slide member 3, the fluid flowing passage 21 of the backwash pipe 4 and the aperture portion 28 of the piston member 20, and then the removed trapped matter enters the drain chamber 12 via the actuation cylinder 5, and is discharged from the drain chamber 12 to the outside in the direction of the arrow C.

When the fluid containing the trapped matter begins to be discharged from the drain outlet 15 as mentioned above, a force that moves the backwash slide member 3 toward the drain chamber 12 (the right side in FIG. 13) acts on the backwash slide member 3. However, in a case in which slide resistance is large, or in which the pressure at the fluid outlet 14 is not sufficiently higher than the normal pressure, in order to generate a force sufficient to move the backwash slide member 3, in FIG. 13, the control fluid is supplied through the fluid flowing unit 6 in the direction of the arrow F and is pressed into the closed space 30 defined inside the actuation cylinder 5 illustrated in FIG. 4 via the fitting 31. Thus, the piston member 20 of the backwash pipe 4 is pressed and moves rightward in FIG. 13, and the entirety of the backwash slide member 3 similarly moves rightward in the filter element 2. At this time, the outer circumferential portion of the backwash slide member 3 slides in contact with the inner circumferential surface of the filter element 2 while the inward flow is generated from the outside toward the inside of the filter element 2, so that the backwashing is carried out, removing the trapped matter adhering to the inner circumferential surface of the filter element 2. In this manner, the backwashing is carried out until the backwash slide member 3 reaches the other end on the right side of the filter element 2. At the time of the backwashing, the filtration by the filter element 2 cannot be carried out efficiently on the left side of the backwash slide member 3. However, by adopting the abovementioned structure illustrated in FIGS. 9A to 9D, the filtration can be carried out continuously in a manner similar to that illustrated in FIG. 1.

Figure 14:
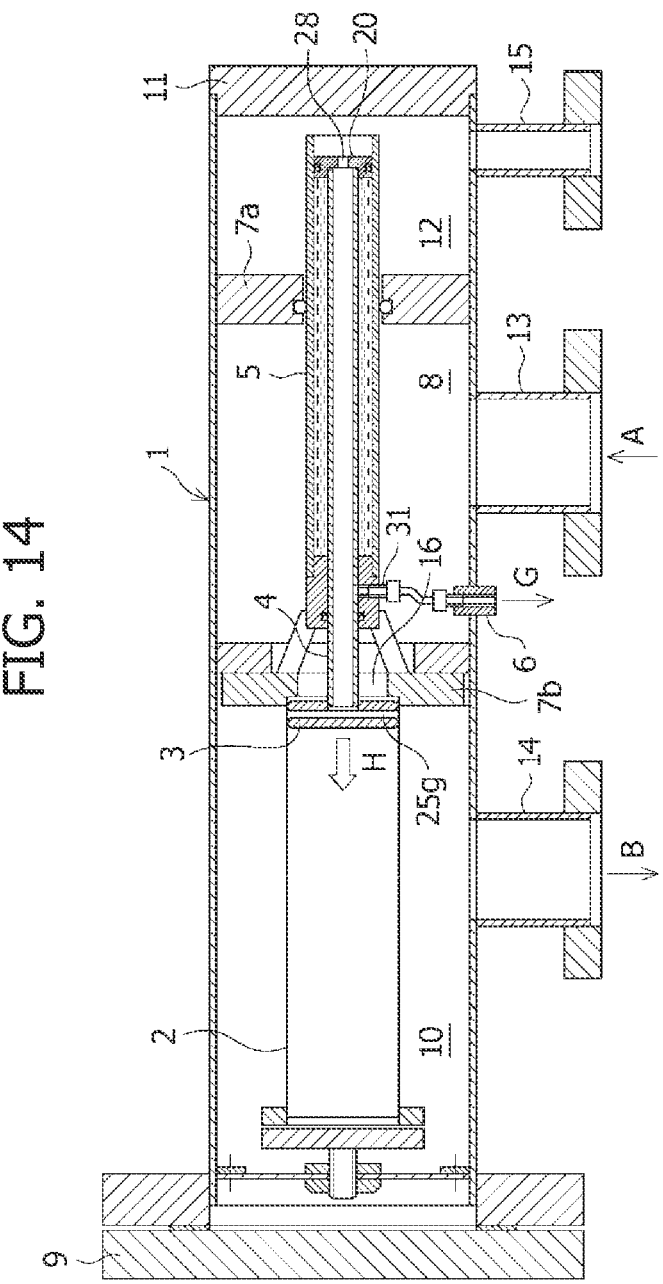
FIG. 14 illustrates another operation state of the fluid flowing unit when the backwash slide member is returned to the initial state subsequent to the operation illustrated in FIG. 13.

FIG. 14 illustrates another operation state of the fluid flowing unit 6 when the backwash slide member 3 is returned to the initial state subsequent to the operation illustrated in FIG. 13. In this state, the backwash slide member 3 is located at the other end on the rightmost side in the filter element 2, and the piston member 20 of the backwash pipe 4 is located at the other end on the rightmost side in the actuation cylinder 5. Such a state is a state in which the backwash slide member 3 blocks the through hole 16 of the second partition plate 7b. In this state, it may be difficult for the target fluid to pass through the through hole 16 and flow into the filter element 2 as illustrated in FIGS. 1 and 13, so that the filtration by the filter element 2 cannot be carried out. Thus, the backwash slide member 3 may need to be returned to the initial state illustrated in FIG. 1.

In this case, in a state in which the fluid is allowed to flow in through the fluid inlet 13 in the direction of the arrow A and the fluid is allowed to flow out through the fluid outlet 14 in the direction of the arrow B, the drain outlet 15 is closed. As a result, discharge of the fluid from the drain chamber 12 is stopped. In other words, by stopping a valve connected to the drain outlet 15, the pressure at the filtration chamber 10 becomes equal to the pressure at the drain chamber 12, since the filtration chamber 10 and the drain chamber 12 communicate with each other, and the flow passing through the aperture portion 28 of the piston member 20 stops. However, only a fluid with a volume equal to the volume of the fluid flowing passage 21 of the backwash pipe 4 and the space 30 in the actuation cylinder 5 flows. At this time, the piston member 20 receives the pressure at the drain chamber 12. At this time, when the fluid flowing unit 6 is opened, the control fluid in the closed space 30 in the actuation cylinder 5 is discharged outside in the direction of the arrow G by the pressure at the drain chamber 12. At this time, by adjusting the discharge rate at the fluid flowing unit 6 by narrowing down a valve or the like of the fluid flowing unit 6, the movement speed of the backwash pipe 4 and the backwash slide member 3 can be controlled. Furthermore, the backwash slide member 3 is about to move leftward by a pressure difference of the fluid which is about to flow into the filter element 2 through the through hole 16 formed in the second partition plate 7b, and thus this force acts as well. As a result, the entirety of the backwash slide member 3 moves leftward in the direction of the arrow H inside the filter element 2. In this manner, the backwash slide member 3 moves until it reaches the one end on the left side of the filter element 2. Thus, the backwash slide member 3 is returned to the initial state illustrated in FIG. 1. Then, the filtration of the target fluid is carried out as illustrated in FIG. 1, and the backwashing of the filter element 2 is carried out as illustrated in FIG. 13.

It is to be noted that, in the case of FIG. 14, the drain outlet 15 may be slightly opened, and that the backwash slide member 3 may be returned while carrying out the backwashing of the filter element 2 illustrated in FIG. 13. In this case, by controlling the pressure at the filtration chamber 10, the pressure at the fluid inflow chamber 8, the pressure at the drain chamber 12, or the pressure or the rate of the control fluid to be discharged through the fluid flowing unit 6, movement of the backwash slide member 3 and a state of the backwashing can be controlled. The simplest control method is to narrow down a fluid port of the fluid flowing unit 6.

Figure 15:
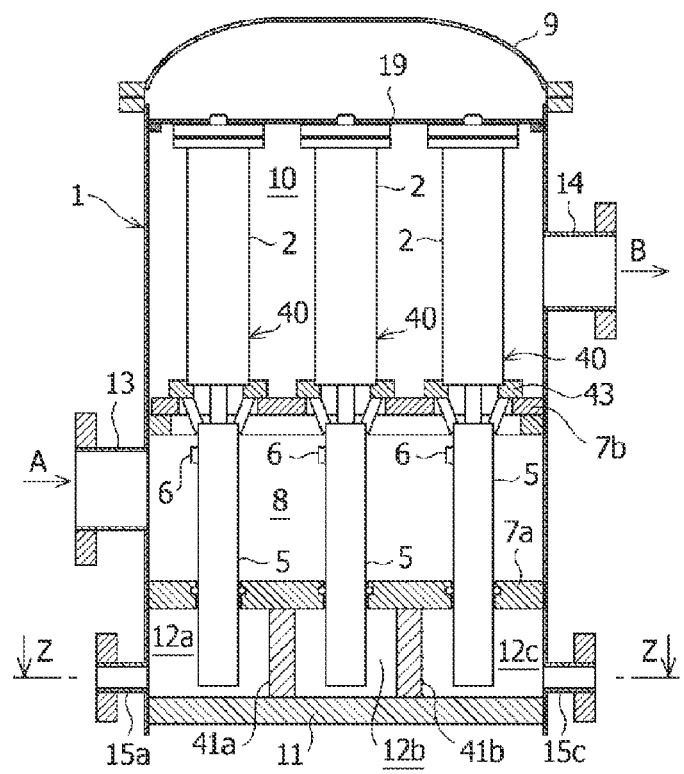
FIG. 15 is a central vertical cross-sectional view illustrating an embodiment of a filter apparatus according to a second aspect of the present invention.

FIG. 15 illustrates an embodiment of a filter apparatus according to a second aspect of the present invention. This filter apparatus has at least two filter units 40 arranged in parallel in the casing 1, which includes, in the sealed space provided therein, the fluid inflow chamber 8 into which the target fluid flows from outside, the filtration chamber 10 in which the target fluid flowing from the fluid inflow chamber 8 is filtered and flows outside, and the drain chamber 12 through which the trapped matter separated by filtration in the filtration chamber 10 is discharged outside. Each filter unit 40 is formed by integrally combining the filter element 2, the backwash slide member 3, the backwash pipe 4, the actuation cylinder 5, and the fluid flowing unit 6 according to the first aspect of the present invention.

In FIG. 15, the casing 1 acts as an outer shell of the filter apparatus, is formed in a tubular shape (for example, a cylindrical shape), a rectangular parallelepiped shape, or the like, having a bottom and a lid, and has the sealed space therein. FIG. 15 shows an example of the casing 1 having a larger diameter than that illustrated in FIG. 1 and formed in a vertical cylindrical shape. An inside of the casing 1 is divided into three chambers by the first partition plate 7a and the second partition plate 7b arranged in the middle in an up-down direction thereof and the end plate 9. Between the first partition plate 7a and the second partition plate 7b, the fluid inflow chamber 8 into which the target fluid flows from outside is provided. Between the second partition plate 7b and the end plate 9 at one end, the filtration chamber 10 in which the target fluid flowing from the fluid inflow chamber 8 is filtered and flows outside is provided. Between the first partition plate 7a and the end plate 11 at the other end, the drain chamber 12 through which the trapped matter separated by filtration in the filtration chamber 10 is discharged to the outside is provided. A material for the casing 1 may be a metal, a synthetic resin, or the like, and the shape and the size thereof may be appropriately determined in accordance with intended use of the filter apparatus, the kind and the amount of liquid, gas, or the like passing through the filter apparatus, the location to install the filter apparatus, and the like. In FIG. 15, a mounting bracket 43 is used to attach the filter elements 2 to the second partition plate 7b.

At a part of the fluid inflow chamber 8, the fluid inlet 13 is provided. With this fluid inlet 13, the fluid supply tube (not shown) is connected. Furthermore, at a part of the filtration chamber 10, the fluid outlet 14 is provided. With this fluid outlet 14, the filtered fluid discharge tube (not shown) is connected. Furthermore, at a part of the drain chamber 12, the drain outlet 15 is provided. With this drain outlet 15, the trapped matter discharge tube (not shown) is connected. The anti-vibration plate 19 is provided close to the end plate 9 at the one end of the casing 1. Furthermore, with the fluid flowing unit 6 of each filter unit 40, a pipe, a tube, or the like (not shown) opened to normal pressure (for example, atmospheric pressure) is connected. It is to be noted that the fluid flowing unit 6 is not limited to one opened to atmospheric air and may be connected with a pipe into which normal-pressure liquid such as water and oil flows. Alternatively, a control fluid having appropriate pressure may be supplied into and discharged through the fluid flowing unit 6.

In the abovementioned configuration of the filter apparatus according to the second aspect of the present invention as well as in the configuration according to the first aspect of the present invention, pressure at the fluid outlet 14 from the filtration chamber 10 is set to be higher than normal pressure (for example, atmospheric pressure), and pressure at the fluid inlet 13 to the fluid inflow chamber 8 is set to be higher than the pressure at the fluid outlet 14. In order to set the pressure at the fluid outlet 14 to be higher than the normal pressure, pipe resistance on the side of the fluid outlet 14 has only to be increased. In this state, by opening and closing the drain outlet 15 of the drain chamber 12 to a lower pressure side than the pressure at the fluid outlet 14, backwashing of the filter element 2 is carried out.

In this manner, by arranging the at least two filter units 40 in parallel inside the large-diameter casing 1, the processing rate of filtration can be increased.

Figure 16:
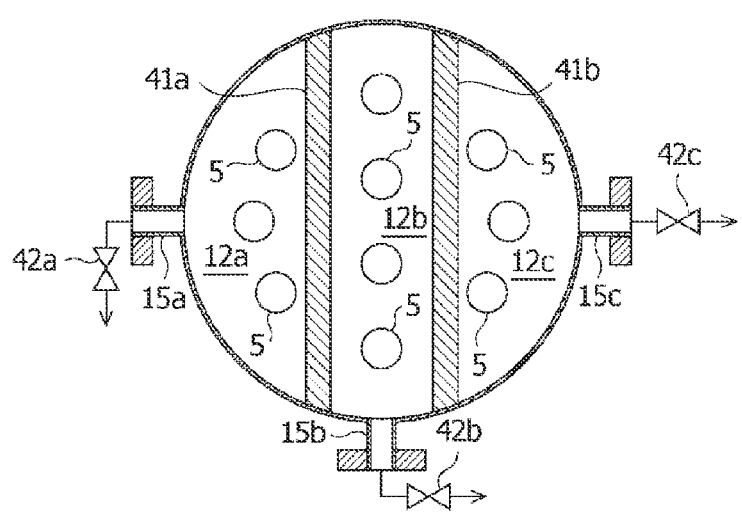
FIG. 16 is a cross-sectional view along the line Z-Z in FIG. 15.

In the second aspect of the present invention, the filter units 40 are divided into multiple groups each having at least one filter unit 40, and the drain chamber 12 in which the other ends of the actuation cylinders 5 of the filter units 40 in the respective groups are located is divided for the respective groups. That is, as illustrated in FIG. 16, a first division plate 41a and a second division plate 41b are provided in the middle of the drain chamber 12 to divide the drain chamber 12 into three chambers, that is, a first drain chamber 12a, a second drain chamber 12b, and a third drain chamber 12c. Thus, in the example in FIGS. 15 and 16, ten filter units 40 in total are divided into three groups. For example, the ten filter units 40 are divided into: a first group including three filter units 40, the other ends of the actuation cylinders 5 thereof being located in the first drain chamber 12a; a second group including four filter units 40, the other ends of the actuation cylinders 5 thereof being located in the second drain chamber 12b; and a third group including three filter units 40, the other ends of the actuation cylinders 5 thereof being located in the third drain chamber 12c.

As illustrated in FIG. 16, at a part of the first drain chamber 12a, a drain outlet 15a is provided, at a part of the second drain chamber 12b, a drain outlet 15b is provided, and at a part of the third drain chamber 12c, a drain outlet 15c is provided. Drain valves 42a, 42b, 42c are provided at the drain outlets 15a, 15b, 15c, respectively. Thus, by controlling opening and closing of the respective drain valves 42a, 42b, 42c, backwashing of the filter units 40 which belong to the respective groups can be controlled separately for the respective groups.

In the embodiment illustrated in FIGS. 15 and 16, since the backwashing is carried out three separate times, that is, the three groups are backwashed one by one, the filter apparatus can be operated with less variation in backwashing rate and filtering rate. The reason for this is described below. In the filter apparatus according to the present invention, the fluid for use in backwashing is part of the filtered fluid, and thus performing the backwash means throwing away part of the filtered fluid. Thus, for example, when the filter elements 2 of the ten filter units 40 are subjected to the backwashing at the same time, a large amount of filtered fluid will be temporarily discharged outside as a backwash fluid. Under such circumstances, for example, by dividing the ten filter units 40 into several groups and performing the backwashing for the respective groups in order, it is possible to prevent a large amount of filtered fluid from being temporarily discharged outside as the backwash fluid.

In the foregoing description, the backwash slide member 3 includes combination of the first disk-shaped member 3a having a predetermined thickness and the second disk-shaped member 3b similarly having a predetermined thickness as illustrated in FIGS. 2 and 8. However, the present invention is not limited to this, and a single disk-shaped member 3 may be formed having a thickness approximately equal to a combined thickness of the first disk-shaped member 3a and the second disk-shaped member 3b, and a radially-arranged gap (or a slit, a passage, or the like) which generates the inward flow by the difference in pressure inside and outside the filter element 2 may be formed within the thickness so as to communicate with the fluid flowing passage 21 of the backwash pipe 4.

The invention claimed is:

1. A filter apparatus comprising:
a casing comprising:
a fluid inlet leading to a fluid inflow chamber;
a filtration chamber leading to a fluid outlet; and
a drain chamber leading to a drain outlet,
wherein the filtration chamber comprises a cylindrical filter element comprising a first closed end and a second open end, wherein the second open end is located closer to the fluid inflow chamber than the first closed end, and wherein the cylindrical filter element allows a target fluid pass therethrough from an inside to an outside of the cylindrical filter element to perform filtration;
a backwash slide member is provided inside the cylindrical filter element in a manner such that an outer circumferential portion of the backwash slide member slides in contact with an inner circumferential surface of the cylindrical filter element, wherein the backwash slide member is capable of moving backward and forward in an axial direction of the cylindrical filter element, and wherein the backwash slide member is capable of removing trapped matter adhering to the inner circumferential surface of the cylindrical filter element by means of an inward flow generated by a difference in pressure inside and outside the cylindrical filter element at a time of backwashing;
a backwash pipe that comprises a first end, a second end, and a fluid flowing passage extending from the first end to the second end, wherein the first end is connected to a side surface of the backwash slide member, wherein the second end is connected to a piston member, wherein the second end is provided with at least one aperture portion at a location in contact with the fluid flowing passage, wherein the aperture portion comprises an opening that is smaller than a cross-sectional area of the fluid flowing passage, and wherein the backwash pipe allows the inward flow generated in the backwash slide member to flow toward the drain chamber;
an actuation cylinder that comprises a first closed end, which is closed by a closing member and is passed through by the backwash pipe, and a second open end, wherein the piston member is fitted from the closed first end of the actuation cylinder in a manner such that the piston member is capable of moving backward and forward to therefore move the backwash slide member backward and forward inside the cylindrical filter element, and wherein the open second end of the actuation cylinder extends into the drain chamber to allow the fluid from the backwash pipe to flow toward the drain chamber and into the drain outlet; and
a fluid flowing channel through which an inside of the actuation cylinder is communicated with an outside of the casing in order to allow a fluid to flow into and out of the actuation cylinder to enable the piston member to move backward and forward inside the actuation cylinder,
wherein the pressure at the fluid outlet is set to be higher than atmospheric pressure, the pressure at the fluid inlet is set to be higher than the pressure at the fluid outlet, and wherein the drain outlet is opened and closed to lower the pressure of the drain chamber compared to the fluid outlet, to carry out the backwashing.

2. The filter apparatus according to claim 1, wherein the backwash slide member is formed to be a disk-shaped member, wherein the backwash slide member comprises a gap within a thickness thereof the fluid flows inward through the gap from the outer circumferential portion of the backwash slide member to a center portion of the backwash slide member due to the difference in pressure inside and outside the cylindrical filter element, and wherein the gap communicates with the fluid flowing passage of the backwash pipe.

3. The filter apparatus according to claim 2, wherein at least one of a brush or a scraper formed in a shape of a blade or paddle is provided along an outer circumferential portion of the disk-shaped member, and wherein the at least one of the brush or the scraper slides in contact with the inner circumferential surface of the cylindrical filter element over an entire circumference thereof.

4. The filter apparatus according to claim 2, wherein the backwash slide member comprises at least one fluid passing opening arranged on disk surfaces of the disk-shaped member, the at least one fluid passing opening penetrating from a first side surface of the backwash slide member to a second side surface of the backwash slide member.

5. The filter apparatus according to claim 1, wherein the fluid flowing unit allows the fluid to freely flow into and out of a space between a closing member provided at the closed first end of the actuation cylinder and the piston member.

6. The filter apparatus according to claim 1, wherein the fluid flowing unit supplies and discharges a control fluid into and from a space between a closing member provided at the closed first end of the actuation cylinder and the piston member.

7. The filter apparatus according to claim 4, wherein the backwash slide member is provided at the first end of the backwash pipe, and at least one additional backwash slide member, configured to enable the inward flow generated by the difference in pressure inside and outside the cylindrical filter element to enter the fluid flowing passage, is provided in a middle portion in the axial direction of the backwash pipe.

* * * * *